United States Patent [19]

Widmann

[11] 4,060,572
[45] Nov. 29, 1977

[54] FOAMING APPARATUS
[75] Inventor: Marcel Widmann, West Hill, Canada
[73] Assignee: Borden Products Limited, West Hill, Canada
[21] Appl. No.: 674,618
[22] Filed: Apr. 7, 1976

Related U.S. Application Data

[63] Continuation of Ser. No. 493,706, July 31, 1974, abandoned.

[51] Int. Cl.² .............................................. B01F 3/04
[52] U.S. Cl. .................................. 261/18 B; 137/238; 239/113; 252/62; 261/50 R; 261/64 R; 261/71; 261/DIG. 26
[58] Field of Search ............... 261/18 B, 71, 76, 64 R, 261/DIG. 26, 49, 50 R; 169/15; 252/359 E, 62; 137/238; 239/112, 113; 23/252 R; 260/2.5 B, 2.5 BC, 2.5 BE, 2.5 AW, 2.5 DG, 2.5 AZ, 2.5 L, 2.5 S, 2.5 F, 2.5 EP

[56] References Cited

U.S. PATENT DOCUMENTS

| 1,457,895 | 6/1923 | Campanella | 261/DIG. 26 |
| 2,198,585 | 4/1940 | Urquhart et al. | 261/76 |
| 2,210,934 | 8/1940 | Gleason | 239/113 |
| 2,540,064 | 1/1951 | Weber | 252/359 E X |
| 2,563,385 | 8/1951 | Warcup | 137/238 |
| 2,571,871 | 10/1951 | Hayes | 261/18 B X |
| 2,769,500 | 11/1956 | Clifford | 261/76 X |
| 2,864,714 | 12/1958 | Dixon, Jr. et al. | 261/DIG. 26 |
| 3,120,864 | 2/1964 | Teufel | 239/113 X |
| 3,186,959 | 6/1965 | Shriver et al. | 261/DIG. 26 |
| 3,199,790 | 8/1965 | Giesemann | 169/15 X |
| 3,301,485 | 1/1967 | Tropeano et al. | 169/15 X |
| 3,356,148 | 12/1967 | Jamison | 169/15 |
| 3,620,306 | 11/1971 | Shepherd | 261/DIG. 26 |
| 3,846,515 | 11/1974 | Williamson | 261/DIG. 26 |
| 3,847,571 | 11/1974 | Cole, Jr. | 261/DIG. 26 |

Primary Examiner—Tim R. Miles
Assistant Examiner—Richard L. Chiesa
Attorney, Agent, or Firm—George A. Kap; George P. Maskas; Daniel D. Mast

[57] ABSTRACT

Portable apparatus is used for dispensing of urea formaldehyde foam for use as a sound and heat insulator. The apparatus includes a framework having mounted therein three valves which are simultaneously actuated by a single handle lever. One valve dispenses air to a connection downstream of another of the valves which dispenses a mixture of water, detergent, and resin hardener while the third valve controls the flow of urea formaldehyde resin. The air and water-detergent mixture are combined in a frothing chamber and together they are conveyed in foamed condition to a mixing chamber. The resin is sprayed into the mixing chamber to combine with the froth and the resulting mixture is propelled into a cavity which will house the insulation.

6 Claims, 5 Drawing Figures

FOAMING APPARATUS

This is a continuation, of application Ser. No. 493,706, filed July 31, 1974, now abandoned.

This invention relates to a foaming apparatus which is characterized by a foaming chamber provided with a mesh screen to facilitate frothing of a foaming agent solution and an air-seepage feature which prevents back-up of foam when the apparatus is shut off. Another important feature resides in the combination of the foaming chamber and a narrower conduit coupled to the foaming chamber on the downstreams side thereof which imparts sufficient back pressure on the foaming agent solution in the foaming chamber to obtain a good quality froth which is subsequently sprayed with a resin solution to produce foam.

Use of urea formaldehyde foams or other hardenable resin foams for insulation is old in many respects. Various kinds of dispensing guns or apparatus have been devised for frothing or foaming a water-based liquid which in turn is mixed with a resin and a resin hardener. After drying, the result is a lightweight mass of dry resin bubbles all adhered together to form a rigid body.

Problems of the prior art are probably obvious from the mere mention of the process. The prime concern in all such operations is a premature hardening of the resin within the apparatus, which of course, will require a shutdown of the operations until a new gun is available or complete cleaning of the mixing and transmitting system is completed.

No discussion appears necessary on the physical mechanism for the encompassing of the water bubble by the resin. Such is well-known in the art and reference to this particular theory of operation does not form part of the invention as described herein.

This special invention has combined the basic elements of the prior art into a special framework and modified some of the parts therein to provide an easily usable unit for mixing and dispensing water-based resin forms without the usual inherent problem of periodic premature hardening of the resin within the mixing and dispensing apparatus.

The framework is provided with a common actuating handle for simultaneously opening three valves within the framework which valves control the flow of (1) air, (2) urea formaldehyde resin, and (3) a mixture of water, detergent and resin hardener.

The air is transmitted from its control valving to a foaming or frothing chamber immediately downstream of the valve controlling the flow of water, detergent, and hardener. The waterdetergent mixture is sprayed through an orifice into the frothing chamber where it is mixed with the air and then together they are forced through a sieve to affect the uniform foaming of the mixture. In conventional systems this foaming or frothing chamber is traditionally filled with glass beads and as will be understood easily, premature hardening of the resin which might back up into this frothing chamber would weld the beads together and have a permanent disabling effect on the frothing chamber. The only way to mend this defect is to replace the bead filled frothing chamber. And, of course, this invention has eliminated this bead-filled chamber and its obvious invitation to malfunction.

The resin is controlled in its flow by the third valve and transmits the resin downstream to a mixing chamber where it is sprayed in a solid cone-shaped pattern into the mixing chamber where the froth is intermixed with the resin. The mixture is then conveyed from the mixing chamber through a duct to an outlet where the foam is dispensed into the cavity where it is to harden.

It goes without saying that the cavity into which the foam is dispensed must be allowed to breathe because the foam will dry and harden. The water forming the bubbles will evaporate leaving only the hard resin shell as the ultimate insulating mechanism. The evaporating moisture must escape to the atmosphere. It is not the purpose of this disclosre to discuss in detail the foaming mixture, etc. as that subject matter is being covered in another application.

The various features of the apparatus of this invention will become apparent from the following detailed description set forth in connection with the accompanying drawings which relate to the preferred embodiment of the present invention and are presented by way of illustration.

Figure 1:
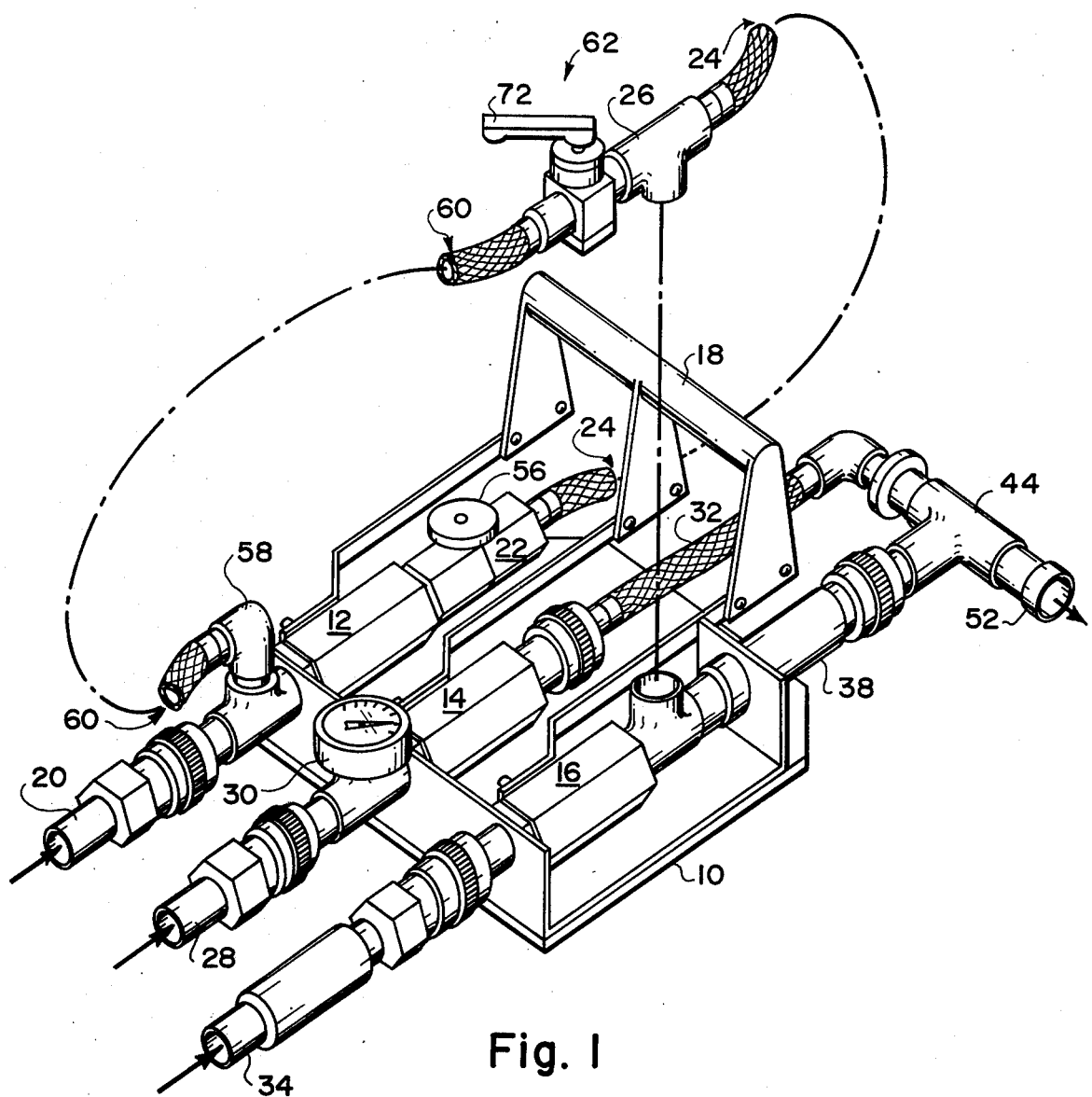
FIG. 1 is a perspective view showing the dispensing and mixing apparatus of the instant invention in a partially exploded view.

Observing FIG. 1, a framework 10 has three valves 12, 14, 16 mounted thereon which are activated by a single handle lever 18. For convenience, the flow passages leading to and from each valve will be analyzed and described in sequence and then the operation of the device as a whole will be set out.

A feedline 20 leads to valve 12 which, when opened, allows flow of air to needle valve 22 and subsequently to hose 24 connected to a T-fitting 26 for unobstructed flow of air into the flowline downstream of valve 16.

Figure 2:
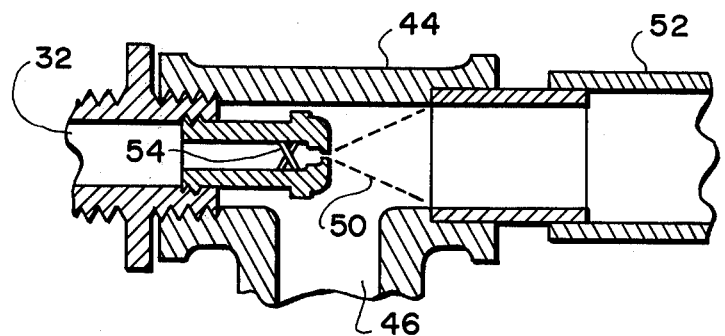
FIG. 2 is a fragmentary sectional view through the mixing chamber of the apparatus of FIG. 1.

Flowline 28 includes a dial guage 30 for checking the overall pressure of the feed of urea formaldehyde resin into valve 14 which in turn leads to a hose 32 and subsequently to a spray nozzle as illustrated in FIG. 2, which sprays the resin in a solid cone-shaped pattern into the mixing chamber which will be described in more detail subsequently.

Figure 5:
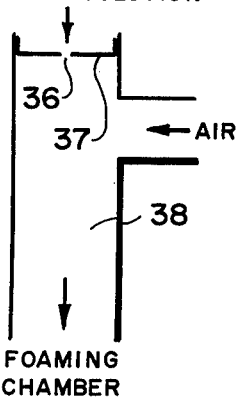
FIG. 5 is a fragmentary diagrammatic view of the orifice leading from the valve controlling the water-detergent mixture, the air feed from one side and the combination traveling together to expand into the foaming chamber.
Figure 4:
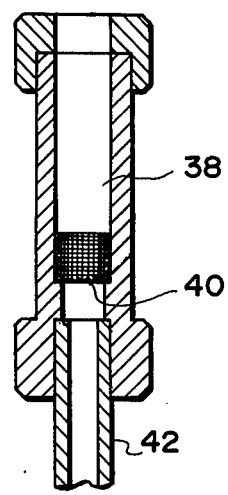
FIG. 4 is a sectional view through the foaming chamber showing the sieve and choke which affect the foaming.

Feedline 34 conveys a mixture of water, detergent, and resin hardener to valve 16 from which it is sprayed through orifice 36 into a cylindrical foaming chamber 38, illustrated in FIGS. 4 and 5 where it is mixed with the turbulent air entering the flowline from T-connection 26. Foaming is created within the foaming chamber by the spray orifice 36, turbulence of the entering air and the back pressure created by the screen or sieve 40 and choke 42. The sieve has mesh size of 50 to 200, preferably 100, U.S. standard mesh. There must be adequate turbulence in the foaming chamber 38 to obtain good quality foam. If the foaming agent is introduced into chamber 38 at a slow rate, turbulence will be low and foam quality will be poor. If foaming agent is introduced too fast, the foam will back up in the chamber through orifice 36 and the liquid will drain out of the chamber giving a wet foam because not all of the foaming agent was incorporated into foam.

Foaming agent is an aqueous solution of 4 to 5% solids which is dispensed at 1200 to 3200 grams per minute, preferably 2000 g/min. The urea formaldehyde resin is also an aqueous solution of about 42% solids which is dispensed at a rate of 1200 to 3500 g/min, preferably at 2600 g/min. Air flow into the foaming chamber is at 50 to 150 liters per minute, preferably at 120 l/min. and pressure in the chamber and in the gun generally is 40 to 90 psi, preferably 80 psi. Output of this apparatus is 1 to 5.5 ft. 3/min. of foam of 0.35 to 2.5 lbs/ft$^3$ density (dry foam) preferably 4.5 ft. $^3$/min. Temperature of the liquid solutions should be from 13° to 30° C. If resin solution is below 13° C., resin solution becomes unstable and separates into two layers; and if it is above 30° C., shelf life thereof is drastically reduced.

The restricting nipple or choke 42 downstream of the sieve 40 but upstream of the mixing chamber 44 is an important aspect of this invention. The choke is shown in somewhat enlarged form in FIG. 4 for purposes of illustration only. If the internal diameter (ID) of the choke is too small or too large, resulting foam will be wet and will have non-uniform cell size. When the choke is too large, the foam components pass through the foaming chamber without adequate mixing. When the choke is too small, the foam backs up and creates a situation where a good deal of the foaming agent will drain out.

In the preferred embodiment, ID of the choke is smaller than ID of the foaming chamber which arrangement creates a small back pressure in the foaming chamber and thus promotes turbulence and mixing of the foam ingredients.

With the particular resin and other ingredients involved in the dispensing apparatus, it is preferred to have all feedlines 20, 28, 34 operating under 80 psi. No doubt this pressure could be modified with sizes of parts and/or different ingredients. Herein the tubing and hoses are about ¼ to ½ inch in diameter and with this pressure and these sizes, it is preferred that the constriction 42 downstream of the screen sieve 40 be approximately 7 millimeters in diameter and approximately 2 centimeters long. Where the parameters are modified, the resulting foam is less satisfactory.

The orifice 36 in valve member 37 is approximately 1.2 millimeters in diameter and the foaming chamber 38 is approximately 13 millimeters in inside diameter and of a length of approximately 6.7 centimeters. These dimensions will no doubt vary with other pressures and other ingredients but they have been found to be very important to the proper operation of the apparatus described herein.

Turning now to FIG. 2 which illustrates the mixing chamber 44 and the surrounding apparatus, the inlets include a feedline 46 from the foaming chamber 38 which will dispense a frothy water-based substance including detergent and resin hardener. From the feedline 32, which conveys the resin, there is a termination nozzle 48 which sprays the resin in a solid cone-shaped pattern 50, illustrated in the drawing by dashed lines. The foam and resin will be combined and mixed and will flow out through the dispensing conduit 52 to where it will be deposited in a cavity for subsequent drying and hardening. Mixing of the hardener solution with the resin also takes place in conduit 52, length and diameter of which is important. It was found that if the conduit is too large, i.e., too wide and not long enough, the foam is not of uniform consistency because there is insufficient turbulence. On the other hand, if the conduit is too narrow and long, foam is ruptured with uneven cell size. When foam is nonuniform, the cell size is uneven and there are patches of too much or too little resin. Conduit 52 should be about 6 feet long and ⅜ inch ID. If the conduit is narrower than ⅜ inch, length thereof can be shorter, and vice versa.

The mixing chamber 44 itself should be about 6 centimeters long and about 1 centimeter in diameter. If the inside diameter is narrower, the mixing chamber can be shorter and vice versa, but the given dimensions are preferred and are found to be satisfactory in operation.

Some of the components in this apparatus get plugged during operation and it becomes necessary to replace them periodically to facilitate this task, some of the components are quick-connect couplings which can be taken off and replaced in seconds.

Whirling turbulence is induced into the resin spray before it exits from nozzle 48 by a short helical plug 54 and the turbulence induced assists greatly in the mixing within the mixing chamber itself.

For convenience at this point, the beginning operation of the apparatus will be described and subsequently, after the operation is completely understood a description of it will follow concerning the unique purging mechanism which insures that clogging and resin backup within the apparatus cannot occur.

Where the apparatus is first connected to the raw materials, that is, the water, resin, and air, certain adjustments must be made and checked. For example, the dial guage 30 will illustrate whether the resin is under proper pressure and other such pressure checks should be conducted. It is not always required to check the pressure of each component, however. If resin, air and foaming solution are propelled by the same pressure source and no pressure-reducing devices are restricting the flow, the pressure of all components will be the same. Thus, it is only required to check the pressure of the resin.

Having made the pressure checks, the handle 18 is lifted to the open position and the handle 56 on needle valve 22 is opened approximately one turn. The resulting foam should be dispensed into an open container or the like where its consistency can be observed. Increase in the opening of the needle valve should continue until a free standing foam is obtained but it should not increase to the point that a noisy foam dispensing operation results. When the free standing foam is obtained, the valve handle 18 may be closed and the apparatus is ready for operation. No further adjustments of the needle valve should be necessary.

As will be clear to those having ordinary skill in the art, at the instant the handle 18 closes valves 12, 14 and 16, the foam and sprayed resin in mixing chamber 44 will begin to dry and harden. Although it is clear that the material will not harden as quicky as it would in an open atmosphere, it is also true that at various times during a days' work the workmen will close the valves and cease operations for lunch and/or various other reasons. In each case, there is a danger that the resin will prematurely harden in the mixing chamber 44 and render the apparatus temporarily inoperable until it is cleaned or replaced. This invention provides a mechanism for quickly purging the material from the mixing chamber and insuring that the resin from the mixing chamber itself will not migrate upstream into the foaming chamber 38 and clog the sieve 40.

Figure 3:
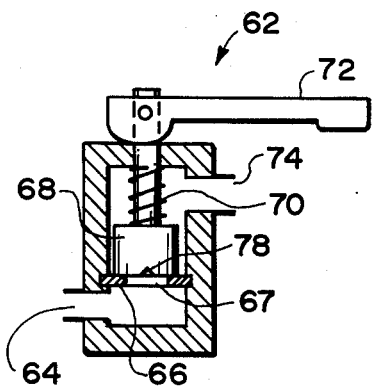
FIG. 3 is a sectional view through the purging valve leading to the foaming chamber.

Observing FIGS. 1 and 3, it will be noted that L-shaped fitting 58 leads directly from line 20 upstream of valve 12 to a line 60 which in turn leads to a toggle valve 62. FIG. 3 illustrates the inlet side 64 of the toggle valve and the valve seat 66 having a cylindrical opening 67, which is closed by valve head 68. The valve head 68 is under pressure from spring 70 in a conventional manner. Obviously, if the handle 72 is raised or lowered, it will compress the spring 70 and lift the valve head 68 from the seat 66. This will allow air to surge through the inlet 64 and the outlet 74 into the T-fitting 26, down through the foaming chamber 38, mixing chamber 44, and out through the conduit 52. Thus, after a foam depositing operation which the workmen anticipates will be the last work done for a long period of time, such as lunch, he will depress toggle handle 72 and purge the remaining resin foam mixture from the system and thereby substantially eliminate the possible danger of foam hardening within the apparatus.

There is another essential feature in this apparatus which is illustrated in FIG. 3. A v-shaped groove 78 is cut diagonally across the face of the valve head 68 which is in contact with valve seat 66. This groove allows some of the air entering through inlet 64 to pass into the valve, and out through exit 74, which leads into foaming chamber 38, then into mixing chamber 44 and finally into hose or conduit 52.

If foam is injected into a closed container, such as a cavity, the pressure in the cavity will slowly rise until it approaches the pressure in the gun. When the gun is turned off without removing the dispenser hose from the cavity, the pressure in the cavity will force the foam into the gun because the pressure in the gun gradually diminishes on account of small leaks, such as in threads and couplings. This will permit the semi-gelled resinous foams to enter vital foam gun parts, such as the sieve and orifices, and thereby render them inoperative. By introducing an air bleeding valve as described above, pressure in the gun cannot diminish since losses in pressure are compensated for instantly. Therefore, no backup of material can occur.

Having thus described the invention, it will be obvious to those having ordinary skill in the art that modifications could be made without departing from the spirit of the invention. It is not intended that the language used to describe the preferred embodiment by limiting on the scope of the invention, rather it is intended only that the invention be limited by the scope of the claims appended hereto.

What we claim is:

1. Apparatus for producing foam without the aid of beads in the foaming chamber comprising a foaming chamber, a mesh screen disposed in said foaming chamber, a choke of reduced cross-section relative to said foaming chamber disposed at the downstream portion of said foaming chamber which functions in cooperation with said mesh screen to promote mixing of air and foaming agent solution, a first conduit in communication with said foaming chamber for introducing foaming agent solution thereinto, a first valve provided in said first conduit upstream of said foaming chamber, a second conduit in communication with said foaming chamber for introducing air under pressure thereinto, a second valve provided in said second conduit upstream of said foaming chamber, a third conduit connected into said second conduit upstream of said second valve and being in communication with said foaming chamber, a third valve provided in said third conduit upstream of said foaming chamber which serves to purge said chamber of any remaining material when opened, a mixing chamber, a connecting conduit between said mixing chamber and said foaming chamber, an exit conduit leading from said mixing chamber, a fourth conduit in communication with said mixing chamber for introducing a resin solution thereinto and fourth valve provided in said fourth conduit upstream of said mixing chamber.

2. Apparatus of claim 1 including a closure at the upstream extremity of said foaming chamber provided with an orifice for admitting foaming agent solution into said foaming chamber, said third valve includes a valve seat and a valve head disposed on said valve seat when said third valve is in a closed condition whereas in its open condition said valve head is displaced above said valve seat, and a notch means in said valve head which allows air under pressure to seep into said foaming chamber at all times when said third valve is in its closed condition thus preventing foam from backing up into said apparatus when it is shut off.

3. Apparatus for producing foam without the aid of beads in the foaming chamber comprising a foaming chamber, a mixing chamber, a conduit connecting said foaming chamber and said mixing chamber, a mesh screen disposed at the downstream portion of said foaming chamber, a choke provided at the downstream extremity of said chamber which is of a reduced cross-section relative to said foaming chamber, a first conduit for introducing foaming agent solution into said foaming chamber, first valve provided in said first conduit upstream of said foaming chamber, second conduit for introducing air under pressure into said foaming chamber, second valve provided in said second conduit upstream of said foaming chamber, a third conduit connected into said second conduit upstream of said second valve and also being in communication with said foaming chamber, a third valve provided in said third conduit upstream of said foaming chamber for purging said foaming chamber of any remaining materials when opened, fourth conduit in communication with said mixing chamber for introducing a resin solution thereinto, and fourth valve provided in said fourth conduit upstream of said mixing chamber.

4. Apparatus of claim 3 wherein said third valve includes a valve seat and a valve head disposed on said valve seat when said third valve is in a closed condition whereas in its open condition said valve head is displaced above said valve seat, and a notch means in said valve head which allows air under pressure to seep into said foaming chamber at all times that said third valve is in its closed condition to prevent foam from backing into said apparatus when it is shut off.

5. Apparatus of claim 4 including a closure at the upstream extremity of said foaming chamber provided with an orifice for admitting foaming agent solution into said foaming chamber.

6. Apparatus of claim 4 including a plug at the end of said fourth conduit for spraying the resin solution onto the frothed foaming agent solution in said mixing chamber.

* * * * *